Oct. 30, 1973
E. H. BAER
3,769,207
PROCESS OF SEPARATION OF EMULSIFIED OR
DISPERSED MATTER FROM WATER
Filed June 14, 1971
4 Sheets-Sheet 1
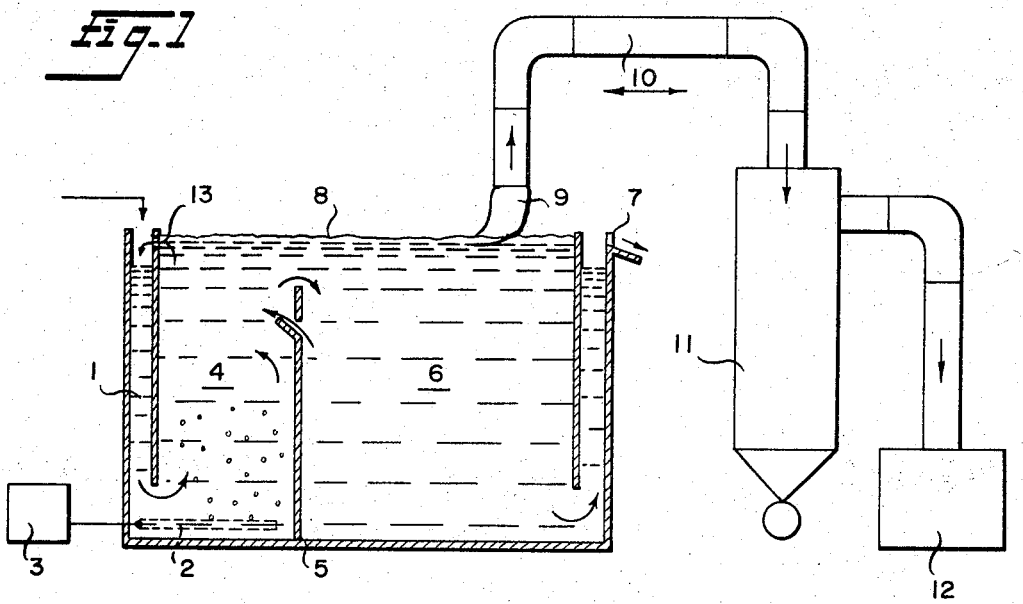
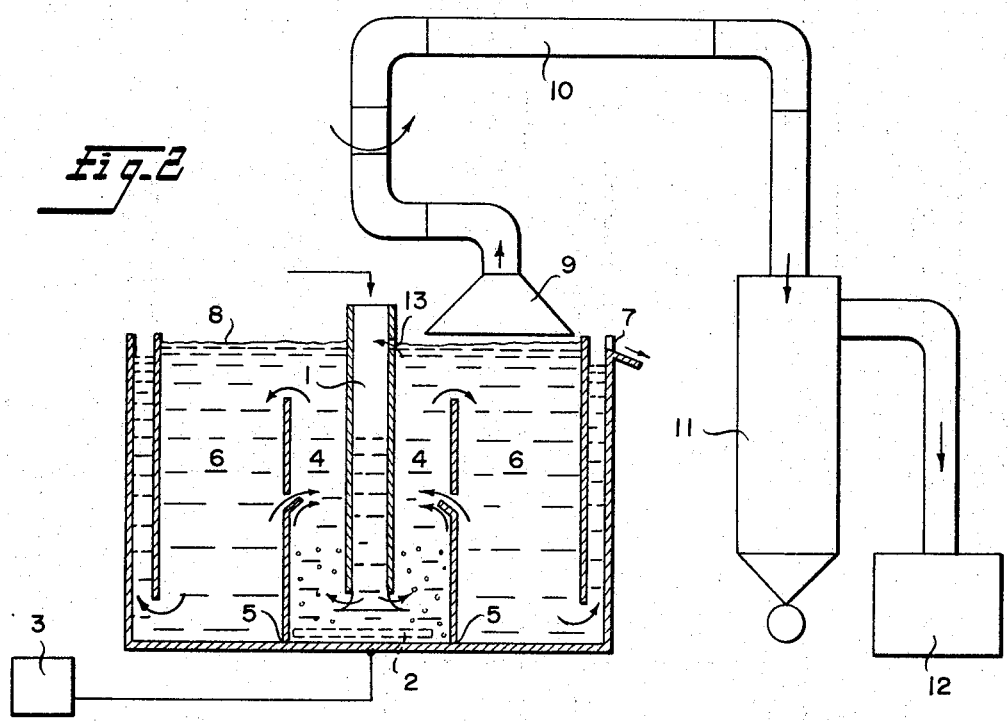
INVENTOR.
Erhardt H. Baer
BY
ATTORNEYS › # United States Patent Office 3,769,207
Patented Oct. 30, 1973

3,769,207
PROCESS OF SEPARATION OF EMULSIFIED
OR DISPERSED MATTER FROM WATER
Erhardt Hermann Baer, 50 Stroofstrasse,
623 Frankfurt am Main 80, Germany
Continuation-in-part of abandoned application Ser. No.
865,580, Oct. 13, 1969. This application June 14, 1971,
Ser. No. 152,659
Int. Cl. B03d 1/00; C02c 1/38
U.S. Cl. 210—44
14 Claims

ABSTRACT OF THE DISCLOSURE

Separation of emulsified or dispersed substances from water involving the purification of waste water by flotation of impurities and removal of accumulated floating sludge comprises the steps of accumulating floating sludge by the flotation of impurities until the floating sludge extends above the surface of the water, severing pneumatically that portion of the sludge above the water surface, and removing the sludge using suction jet means. Apparatus is provided therefor.

CROSS-REFERENCE TO RELATED APPLICATIONS

This application is a continuation-in-part of my copending application, U.S. Ser. No. 865,580, filed Oct. 13, 1969, now abandoned.

BACKGROUND OF THE INVENTION

In waste water, incompletely dissolved impurities exist mainly in the form of small suspended particles or as an emulsion. It is the purpose of every purification process to remove these impurities. However, where water is also used as a carrier in a production process, the transported particles must again and repeatedly be removed from the water. The circulating water in a papermaking machine is a typical example.

In both cases, it is necessary to remove the particles from the water in the most concentrated form, i.e., mixed with as little water as possible.

Methods employed thus far for the purification of waste water provide little guarantee of a rapid and reliable separation of these solids. In the settling basins of biological clarification plants, for instance, the clarification sludge accumulates over a two-hour period in the secondary clarification basin to give a solids content of only 0.6 to 1.2%. Other known separation methods, such as centrifugation and filtration, present considerable, though different, disadvantages.

For these reasons, a new field of application is opening up for flotation processes, particularly since the technical process using electrolytically produced gas bubbles has become feasible (see German Pat. 203,702; U.S. Pat. 3,347,786).

In contrast to the sedimentation process, in which the particles which are to be removed from the water must sink by gravity to the bottom of the vessel, during a flotation process the particles are floated by small air bubbles to the water surface. Whereas sedimentation works only for particles with a specific weight greater than water, in the flotation process all particles are carried upward by the bubbles. However, if the impurities of the waste water are colloidal or emulsified, suitable steps must be taken before or during the flotation process to coagulate the tiny particles into larger, floatable particles. As in earlier processes, this can be done by adding a flocculation agent, e.g., aluminum sulphate or iron chloride, and where necessary adjusting to the appropriate pH value. The precipitation products are carried to the surface by the adhering gas bubbles and form a sludge layer on the surface.

It is of great importance that all particles are supplied with a sufficiently large number of gas bubbles in order to ensure their rise to the surface, and it is also important that the flotation equipment is arranged in such a way that the sludge can be removed from the surface with as much water removed, that is, in as concentrated a form, as possible.

The rapidity of the rise of each particle is in direct proportion to the number of gas bubbles which can be made to adhere to the particle in the flotation space and, the greater the surface of each particle, the more likely it is that a bubble can adhere to it. Particles which are too small may therefore have to be coagulated into larger particles before they become floatable. Another factor is the time the particles remain in the space above the electrodes since the longer the particles remain in this space, the greater will be the likelihood that they encounter gas bubbles which adhere to them.

It has been attemtped to remove the sludge accumulating on the waste water surface during flotation by means of suction normal to the water surface or by blowing an air stream thereacross (U.S. Pats. 2,793,185 and 3,523,-891). However, such procedures necessarily disturb the water surface and result in the removal of substantial amounts of entrained water which, in turn, increases the sludge transportation costs to the disposal station and also the sludge burn-up costs, because the water that has been carried along must be evaporated and thus there is an attendant increase in fuel requirements.

It is an object of the present invention to obviate the foregoing difficulties and to provide an apparatus and process whereby floating sludge can be readily and effectively removed in an economical manner.

Still other objects will readily present themselves to one skilled in the art upon reference to the ensuing specification, the drawings, and the claims.

SUMMARY OF THE INVENTION

The present invention contemplates a process and an apparatus for the removal of sludge floating above the waste water surface without substantially disturbing the water surface. The process steps include accumulating floating sludge by flotation of impurities until the floating sludge extends above the surface of the water, severing that portion of the floating sludge which extends above the water surface from the remainder of the floating sludge, and thereafter pneumatically removing the severed portion.

Apparatus for effective implementation of this process comprises a chamber adapted for flotation of impurities and production of floating sludge on and above the surface of the water contained in the chamber; a movable knife edge means situated immediately above the water level in the chamber, parallel to water surface, and adapted to sever that portion of the floating sludge which extends above the water surface; and a movable suction jet means situated substantially above the knife edge means, adapted to move in unison therewith, and adapted to pneumatically remove the severed sludge without substantially disturbing the water surface.

BRIEF DESCRIPTION OF THE DRAWINGS

In the drawings:

FIG. 1 shows a side elevational view, partly in section, of a rectangular basin or chamber suitable for the generation of floating sludge;

FIG. 2 shows a side elevational view, partly in section, of a circular chamber suitable for the generation of floating sludge;

DESCRIPTION OF THE PREFERRED EMBODIMENTS

Figure 3:
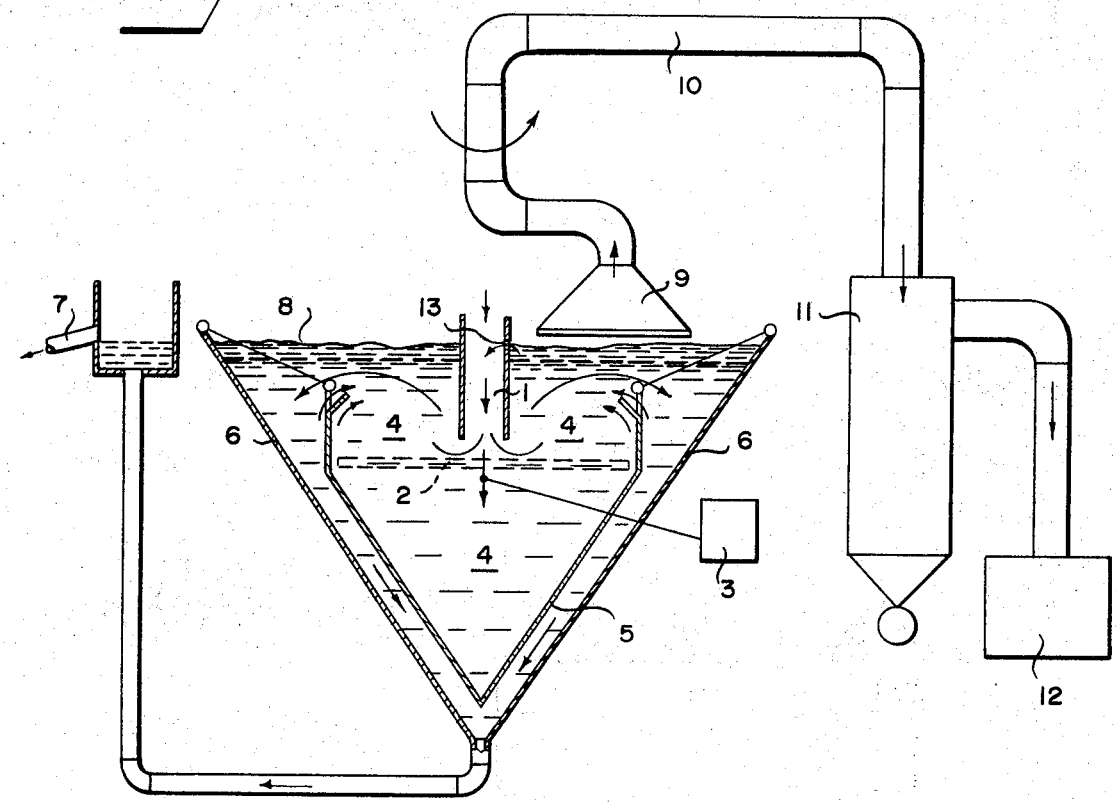
FIG. 3 shows a side elevational view, partly in section, of a conical or funnel-shaped chamber suitable for the generation of floating sludge.

Referring to FIGS. 1, 2 and 3, the waste water to be purified is directed through inlet or shaft 1 over or through electrodes 2, which run parallel, though they are electrically isolated from one another, the flow of water being directed in the direction of the arrow by means of a dividing wall 5 and preferably also suitably arranged directing slot or slots, so that a vortex is formed in space 4, this vortex being constantly covered with the gas bubble cloud which is formed under direct current (current source 3) by electrolysis at the electrodes 2.

Those particles to which a sufficient number of gas bubbles adhere will rise and will form sludge layer 8 on the water surface of flotation space or zone 4 and stabilizing space or zone 6. Accordingly, particles which are too heavy will remain in the flotation space for a correspondingly longer period of time. If it becomes necessary to add a flocculation agent to the waste water prior to flotation, the vortex takes on a function similar to that of the circulation during the so-called sludge-contact process. Fresh sludge particles which enter with the waste water are then brought into contact with "old" sludge particles, which promotes coagulation and requires less flocculation material. This effect is promoted further, since an opening, preferably in the form of slot 13, in the dividing wall of inflow sahft (i.e., incoming waste water inlet) 1 makes possible a constant recirculation of some of the "old" floating sludge into the inflow, if desired.

The formation of a vortex in flotation space or zone 4 is also promoted by providing a further opening, also preferably in the form of a slot, at a suitable height in dividing wall 5, through which opening, e.g., slot, any not completely purified water from stabilization space or zone 6 can flow back into flotation space or zone 4, due to the difference in density.

This process can be realized with equipment according to FIG. 1 in a rectangular basin or chamber, or according to FIG. 2 in a round basin or chamber, or according to FIG. 3 in a funnel-type chamber. All three forms are identical in function.

The process can be continuous. An overflow system 7 ensures that the filling level of the vessel remains constant. If no sludge is removed from the surface, the sludge layer will constantly increase in thickness due to the particles rising from below, from which it must be assumed that the specific weight of the sludge is lower than that of water. Accordingly, part of sludge layer 8 will protrude above the level of the water, as determined by the overflow edge 7. This upper sludge layer is thoroughly drained by a natural process, involving difference in densities and flotation of the material of least density or specific weight, in the manner already indicated, in contrast to sludge which merely settles in a settling basin and remains "constantly in water."

The process of this invention and the equipment described make it possible to remove this highly drained and therefore concentrated upper sludge layer. All known removal equipment has the disadvantage that too much water is removed along with solids in the removal process, because the entire sludge layer is removed, including that part which is below the water level.

According to the new process, the upper sludge layer, which protrudes significantly above the water level as determined by overflow edge 7, is first severed and then suctioned off, preferably by means of a jet 9 having a slot-like opening, the lower end of the jet being above the water level. Jet 9 is connected to a separation container 11 by a telescope-like flexible or rotatable tube 10, and a partial vacuum (i.e., a suction) is produced in the separation container by means of blower 12.

While jet 9 is moved through the sludge layer, but above the water level, a strong air stream is sucked through jet 9, and this air stream creates a vacuum, which will ordinarily be only a partial vacuum. This vacuum pneumatically picks up and transports the drained concentrated sludge layer into the separation container 11. In order to prevent the jet airstream from suctioning up less thoroughly drained sludge from the region below the water level, a knife edge means such as horizontal plate 14 (FIG. 4) is advantageously arranged below the airstream in spaced relation to (usually a few millimeters below) the jet entrance in such a way that it severs sludge floating above the water as the knife edge means moves parallel to the water surface along with jet 9. If necessary, the entire sludge collection equipment, including the jet, connecting tube, collection container, and blower may be mounted on a movable platform, e.g., movable on rails, to facilitate such parallel movement of the jet above the water surface.

Figure 4:
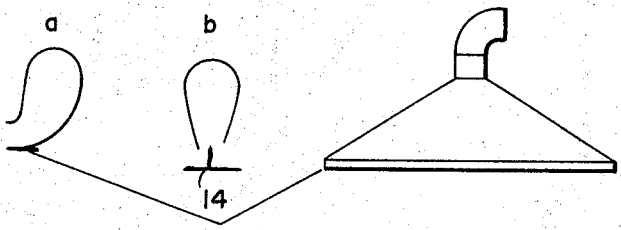
FIG. 4 shows one embodiment of a suction jet means suitable for the practice of this invention.

Possible cross sections, identified $a$ and $b$, of jet 9 as well as a side view, in each case with horizontal plate 14 in place, are shown in FIG. 4. The width of jet 9 is not critical and in some instances it is preferable that the slot-like opening of jet 9, together with horizontal plate 14 extend the entire width of the sludge flotation chamber so that the upper sludge layer can be removed from the maximum sludge area in one traverse and with a minimum of turbulence resulting from the air flow. It is preferred that the slot-like opening of jet 9 faces downwardly, for example straight down as shown in FIG. 4b; howver this is not critical. The opening may also be normal to the sludge layer as shown in FIG. 4a. It is extremely important, however, that the knife edge means, in the form of a plate or trough, or the like, be situated below jet 9 but above the water surface, i.e., between the jet opening and the water surface.

Figure 5:
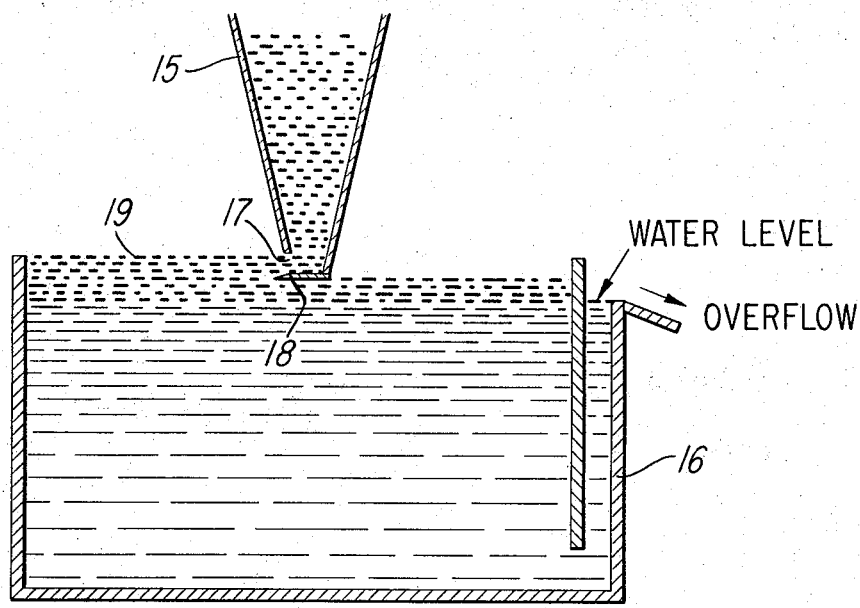
FIG. 5 shows a sectional elevation of another embodiment of a suction jet means where the knife edge means is mounted directly on one side of the suction jet means.

Referring to FIG. 5, movable suction jet means 15 is situated immediately above the water level in chamber 16 and is provided with a downwardly-facing, elongated, slot-like opening 17. Horizontal plate 18 is mounted on jet means 15 below opening 17 and severs upper sludge layer 19 as jet means 15 traverses chamber 16. The severed sludge layer is drawn into jet means 15 and transported away at the same time. Direct mounting of the knife edge means such as plate 18 on jet means 15 is preferred inasmuch as the possibility of the air flow into jet means 15 disturbing the water surface in chamber 16 is minimized.

Figure 6:
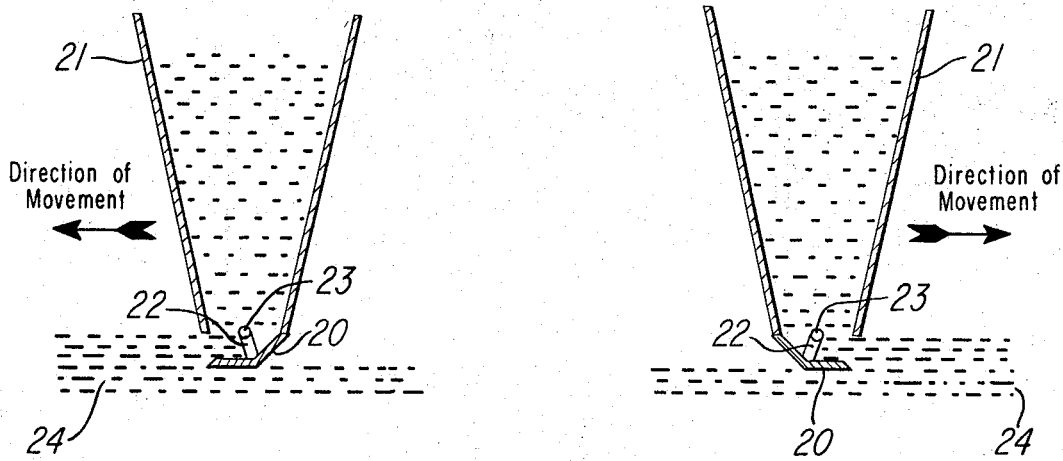
FIG. 6 shows a sectional elevation of yet another embodiment of a suction jet means in combination with a pivoting knife edge means.

In another embodiment of the present invention, shown in FIG. 6, the knife edge means is in the form of a trough, such as V-shaped trough 20, pivotally mounted below the opening of suction jet 21 by means of arm 22 rigidly affixed to trough 20 and pivotally affixed at 23 to suction jet 21. The configuration of trough 20 is such that as jet 21 traverses sludge layer 24, one side of trough 20 lies horizontally and substantially parallel to the water surface below sludge layer 24 while the other side of the trough abuts jet means 21 thereby preventing or minimizing undesirable stray air currents. While a V-shaped trough is preferable, a trough having a curved configuration can be used as well, provided the outer or leading edge of the trough is adapted to assume the substantially horizontal position necessary for the proper severance of the sludge layer.

Figure 7:
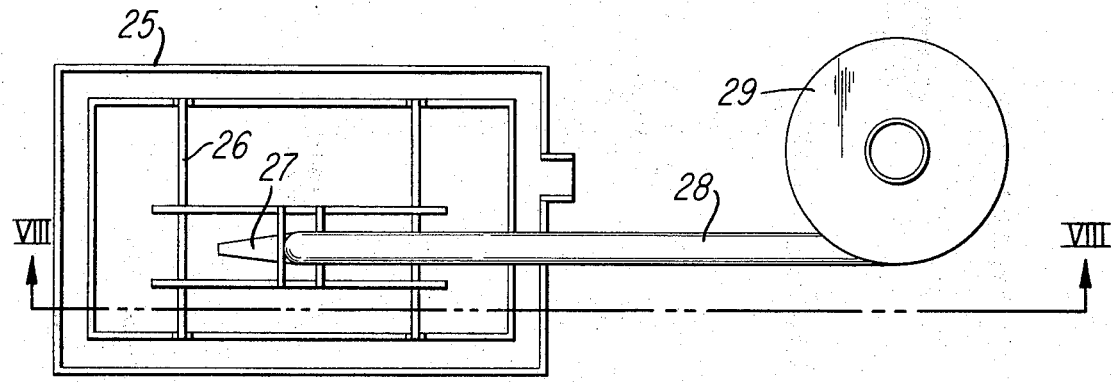
FIG. 7 shows a top view of a system for practicing the process of this invention utilizing a cyclone-type separation chamber for the removed sludge.
Figure 8:
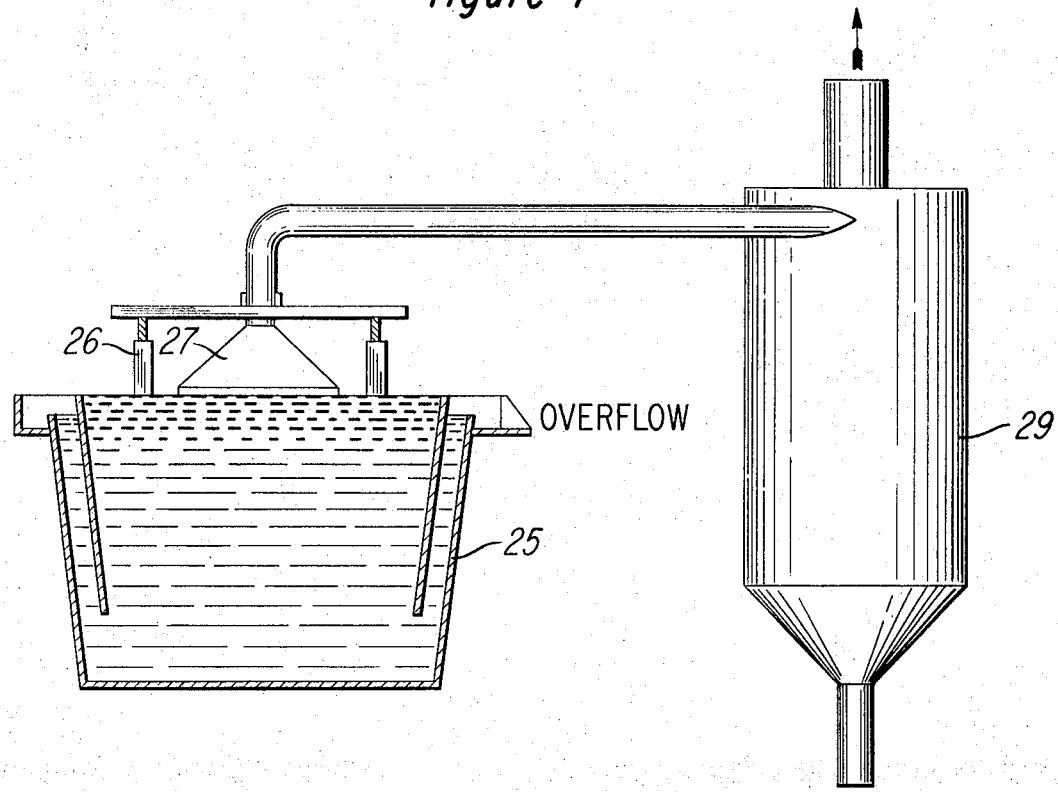
FIG. 8 shows an elevational view of the system shown in FIG. 7 with a sectional view taken along line VIII—VIII of FIG. 7.

FIGS. 7 and 8 show a system embodying the present invention. Chamber 25 is provided with movable carrier frame 26 adapted to receive and carry suction jet means 27, equipped with a suitable knife edge means. Flexible, telescoping hose 28 connects suction jet means 27 with a separation chamber such as cyclone 29 where the sludge is separated from the carrier air current.

The foregoing discussion and the accompanying drawings are intended as illustrative and are not to be construed as limiting. Still other variations within the spirit and scope of this invention will readily present themselves to one skilled in the art.

I claim:

1. In a process for the separation of emulsified or dispersed substances from water involving the purification of waste water by flotation of impurities and removal of accumulated floating sludge, the steps of
   accumulating floating sludge by flotation of impurities until the floating sludge extends above the surface of the water;
   horizontally severing that portion of the floating sludge which extends above the water surface from the remainder of floating sludge without touching or substantially disturbing the water surface by moving a knife edge means in a horizontal direction substantially parallel to and immediately above the water surface in contact with the sludge; and
   pneumatically removing the severed portion of the floating sludge in a substantially upward direction from the water surface.

2. The process of claim 1 wherein the creation of floating sludge extending above the surface of the water is facilitated by the generation of gas bubbles below the water surface.

3. The process of claim 1 wherein the creation of floating sludge is facilitated by providing a vortex which rotates about a horizontal axis in the waste water being treated to assist in the more complete flotation of impurities.

4. The process of claim 3 wherein the waste water is treated in a chamber divided into a stabilization zone and a flotation zone, and wherein the vortex is produced in the flotation zone by recirculation of water from the stabilization zone into the flotation zone.

5. The process of claim 1 wherein a portion of the floating sludge is recirculated with incoming waste water to facilitate the accumulation of impurities and assist in their flotation.

6. An apparatus for the separation of emulsified or dispersed substances from water involving the purification of waste water by floating of impurities and removal of accumulated floating sludge which comprises
   a chamber adapted for flotation of impurities and production of floating sludge on and above the surface of water contained in said chamber;
   a movable horizontal knife edge means situated immediately above the water surface in said chamber, parallel to the water surface, and adapted to horizontally sever that portion of the floating sludge which extends above the water surface; and
   a movable suction jet means situated substantially above said knife edge means, adapted to move in unison therewith, and adapted to pneumatically remove severed sludge in a substantially upward direction from the water surface without touching or substantially disturbing the water surface.

7. The apparatus of claim 6 wherein the movable knife edge means comprises a horizontal plate situated below the suction jet means, and wherein the suction jet means is provided with an elongated slot opening adapted to receive severed sludge.

8. The apparatus of claim 7 wherein the knife edge means is mounted on the suction jet means below the opening thereof.

9. The apparatus of claim 6 wherein the movable knife edge means is a trough pivotally mounted below a downwardly-facing opening of the suction jet means and situated so that one side of the trough is substantially parallel to the water surface and the other side of the trough abuts one side of the downwardly facing opening of the suction jet means as the trough and the suction jet means are moved together against floating sludge extending above the water surface.

10. The apparatus of claim 9 wherein the trough is V-shaped.

11. The apparatus of claim 6 wherein a separation chamber communicating with the suction jet means and adapted to receive the pneumatically removed sludge is provided.

12. The apparatus of claim 11 wherein the separation chamber is a cyclone.

13. The apparatus of claim 6 wherein the chamber is provided with means for generation of gas bubbles for assisting the flotation of impurities to the water surface.

14. The apparatus of claim 6 wherein the chamber is provided with a movable carriage frame adapted to receive and carry the knife edge means and the suction jet means, and to facilitate the movement thereof in a plane parallel to the water surface.

References Cited
UNITED STATES PATENTS

| | | | |
|---|---|---|---|
| 3,284,993 | 11/1966 | Sebald et al. | 55—178 |
| 2,765,081 | 10/1956 | Evans et al. | 210—44 |
| 3,298,615 | 1/1967 | Echols | 55—178 X |
| 3,219,189 | 11/1965 | Moore | 210—540 X |
| 3,642,618 | 2/1972 | Silva | 210—44 |
| 3,523,891 | 8/1970 | Mehl | 210—44 |

SAMIH N. ZAHARNA, Primary Examiner

T. G. WYSE, Assistant Examiner

U.S. Cl. X.R.

210—221, 241, 523; 55—178; 209—170